(12) United States Patent
Imfeld et al.

(10) Patent No.: US 10,851,997 B2
(45) Date of Patent: Dec. 1, 2020

(54) COMBUSTOR DEVICE FOR A GAS TURBINE ENGINE AND GAS TURBINE ENGINE INCORPORATING SAID COMBUSTOR DEVICE

(71) Applicant: ANSALDO ENERGIA SWITZERLAND AG, Baden (CH)

(72) Inventors: Jost Imfeld, Scherz (CH); Slawomir Swiatek, Turgi (CH); Oliver Konradt, Waldshut-Tiengen (DE)

(73) Assignee: ANSALDO ENERGIA SWITZERLANG AG, Baden (CH)

( * ) Notice: Subject to any disclaimer, the term of this patent is extended or adjusted under 35 U.S.C. 154(b) by 447 days.

(21) Appl. No.: 15/725,751

(22) Filed: Oct. 5, 2017

(65) Prior Publication Data
US 2018/0100651 A1    Apr. 12, 2018

(30) Foreign Application Priority Data
Oct. 6, 2016  (EP) ..................... 16192707

(51) Int. Cl.
*F23R 3/08* (2006.01)
*F23C 6/04* (2006.01)
(Continued)

(52) U.S. Cl.
CPC ............... *F23R 3/08* (2013.01); *F01D 9/023* (2013.01); *F02C 3/205* (2013.01); *F02C 7/28* (2013.01);
(Continued)

(58) Field of Classification Search
CPC .... F02C 7/20; F02C 7/28; F23R 3/002; F23R 3/08; F23R 3/42; F23R 3/60; F23R 2900/00012; F01D 9/023
See application file for complete search history.

(56) References Cited

U.S. PATENT DOCUMENTS 6,425,240 B1    7/2002  Park
6,502,825 B2 *  1/2003  Aksit .................. F16J 15/3288
                                                      277/355
(Continued)

FOREIGN PATENT DOCUMENTS

CN    103443542 A    12/2013
CN    105570929 A     5/2016
(Continued)

OTHER PUBLICATIONS

European Search Report dated Mar. 6, 2017.
(Continued)

*Primary Examiner* — Arun Goyal
(74) *Attorney, Agent, or Firm* — Buchanan Ingersoll & Rooney PC

(57) ABSTRACT

A combustor device for a gas turbines engines includes first and a second tubular members telescopically fitted in axially sliding manner to one another with interposition of annular centering and sealing which include at least a centering annular shoulder and a sealing ring arranged coaxial to one another. The sealing ring is axially spaced apart from the centering annular shoulder so that an axial distance between the centering annular shoulder and the sealing ring is greater than a maximum axial movement allowed between the first and said second tubular members.

7 Claims, 3 Drawing Sheets

(51) Int. Cl.
  *F01D 9/02* (2006.01)
  *F02C 3/20* (2006.01)
  *F02C 7/28* (2006.01)
  *F23R 3/60* (2006.01)

(52) U.S. Cl.
  CPC ............... *F23C 6/047* (2013.01); *F23R 3/60* (2013.01); *F23D 2900/14004* (2013.01); *F23M 2900/05002* (2013.01); *F23R 2900/00012* (2013.01); *F23R 2900/03341* (2013.01)

(56) References Cited

U.S. PATENT DOCUMENTS

| | | | |
|---|---|---|---|
| 7,857,576 B2* | 12/2010 | Durocher | F01D 9/023 |
| | | | 277/630 |
| 9,447,973 B2* | 9/2016 | Clemen | F23R 3/02 |
| 10,222,064 B2* | 3/2019 | Kostka | F23M 5/04 |

| | | | |
|---|---|---|---|
| 2009/0288422 A1 | 11/2009 | Cernay et al. | |
| 2010/0126184 A1 | 5/2010 | Poyyapakkam et al. | |
| 2014/0033728 A1 | 2/2014 | Marmilic et al. | |
| 2016/0123595 A1 | 5/2016 | Eroglu et al. | |

FOREIGN PATENT DOCUMENTS

| | | |
|---|---|---|
| EP | 1 063 476 A1 | 12/2000 |
| EP | 2 128 524 A1 | 12/2009 |
| EP | 3 015 772 A1 | 5/2016 |
| JP | 55-81230 A | 6/1980 |

OTHER PUBLICATIONS

The First Office Action issued by the State Intellectual Property Office of People's Republic of China in corresponding Chinese Patent Application No. 201710909547.7 dated Apr. 3, 2020 (18 pages including partial English translation).

* cited by examiner

COMBUSTOR DEVICE FOR A GAS TURBINE ENGINE AND GAS TURBINE ENGINE INCORPORATING SAID COMBUSTOR DEVICE

PRIORITY CLAIM

This application claims priority from Italian Patent Application No. 16192707.4 filed on Oct. 6, 2016, the disclosure of which is incorporated by reference.

TECHNICAL FIELD

The present invention relates to a combustor device for a gas turbine engine and to a gas turbine engine incorporating said combustor device.

More specifically, the present invention preferably relates to combustor device for gas turbines engine with sequential combustion, use to which the following description will make explicit reference purely by way of example and without implying any loss of generality.

BACKGROUND

As is known, a combustor device for gas turbine engines with sequential combustion generally comprises: a first burner; a first combustion chamber located downstream of the first burner; and a mixer which is located downstream of the first combustion and is structured for admixing a dilution gas to the hot gases leaving the first combustion chamber during operation. Downstream of the mixer, the combustor device moreover comprises a second burner, and a second combustion chamber located downstream of the second burner.

The first burner, the first combustion chamber, the mixer, the second burner and the second combustion chamber are arranged in sequential fluid communication to one another. Fuel is introduced into the first burner via a corresponding first fuel injector, is immediately mixed with compressed air arriving from the multi-stage compressor of the gas turbine engine, and is combusted inside the adjacent first combustion chamber. Additional fuel is introduced into the second burner via a second fuel injector, is mixed with hot gases arriving from the mixer, and is combusted inside the adjacent second combustion chamber.

The high-pressure and high-temperature hot gases leaving the second combustion chamber are channeled to the subsequent multi-stage expansion turbine of the gas turbine engine.

To support both thermal and mechanical stresses, first combustion chamber is generally delimited by a tubular casing usually having a twin-shell structure and which is cooled by a combination of external convection and internal film convection. The first burner is usually located inside the twin-shell tubular casing, at inlet section of said tubular casing.

More specifically, the tubular casing generally includes: a tubular inner member accommodating the first burner and delimiting the first combustion chamber, and a tubular outer member that encloses the inner tubular member slightly spaced from the inner tubular member so as to form an annular interspace which receives compressed air from the multi-stage compressor of the gas turbine engine.

The mixer of combustor device, in turn, basically comprises a roughly-cylindrical, tubular member which is coupled to the distal end of the twin-shell tubular casing for receiving the flow of hot gasses, and is provided with a plenty of pass-through holes allowing the compressed air arriving from compressor of the gas turbine engine to freely enter into the tubular member and therein mix with the hot gasses flowing inside the mixer directed towards the second combustion chamber.

To allow free axial thermal dilatation of the combustor device, the tubular member of the mixer is generally stably coupled to a corresponding supporting structure and is telescopically fitted in axially sliding and angularly rigid manner onto the distal end of the tubular inner member of the twin-shell tubular casing.

More specifically, the tubular inner member of the twin-shell tubular casing is usually provided with a centering annular shoulder that protrudes outwards and stably slidingly abuts on a corresponding, complementary-shaped, annular mating portion of the tubular member of the mixer. This annular shoulder usually has a polygonal profile thus to prevent axial rotation of the twin-shell tubular casing with respect to the tubular member of the mixer and moreover internally accommodates a sealing ring that presses against the inner surface of the same tubular member, at the mating portion of the tubular member.

Unfortunately during normal operation of the gas turbine engine, the various component parts of combustor device are used to move axially back and forth thus causing progressive wear of the area of the inner surface of tubular member of the mixer within the annular mating portion. This worn surface, in the long term, may prevent sealing ring to operate correctly and/or may irreparably damage the sealing ring with all problems that this entail.

DISCLOSURE OF THE INVENTION

Aim of the present invention is to avoid the drawbacks connected to normal wear of the inner surface of supporting body.

In compliance with these aims, according to the present invention there is provided a combustor device for a gas turbine engine comprising a first and a second tubular members telescopically fitted in axially sliding manner to one another with the interposition of annular centering and sealing means which include at least a centering annular shoulder and a sealing ring arranged coaxial to one another; the combustor device being characterized in that said sealing ring is axially spaced apart from said centering annular shoulder so that the axial distance between the centering annular shoulder and the sealing ring is greater than the maximum axial movement allowed between said first and said second tubular members.

Preferably, though not necessarily, the combustor device is furthermore characterized in that the centering annular shoulder protrudes outwards from said first tubular member and stably slidingly abuts on a corresponding, complementary-shaped, annular mating portion of the inner surface of the second tubular member.

Preferably, though not necessarily, the combustor device is furthermore characterized in that one of said first and a second tubular members is provided with an annular seat dimensioned to accommodate said sealing ring.

Preferably, though not necessarily, the combustor device is furthermore characterized in that the annular seat is formed on said first tubular member axially spaced apart from said centering annular shoulder, so that the sealing ring and the centering annular shoulder stably abut against the inner surface of said second tubular member at respective annular mating portions spaced apart and separated to one another.

Preferably, though not necessarily, the combustor device is furthermore characterized in that any one of the preceding claims, characterized in that said centering annular shoulder has a polygonal profile, thus to prevent any relative axial rotation of said first and second tubular members.

Preferably, though not necessarily, the combustor device is furthermore characterized in that said first tubular member delimits a first combustion chamber wherein combustion of an inflammable mixture occurs, and moreover internally accommodates a first burner adapted to mix fuel to the compressed air arriving from the compressor of the gas turbines engine for producing said inflammable mixture.

Preferably, though not necessarily, the combustor device is furthermore characterized in that said second tubular member is telescopically fitted to said first tubular member for receiving the hot gasses leaving said first combustion chamber, and is provided with a series of pass-through holes and/or inwardly-protruding pipe fittings allowing a dilution gas present outside of said second tubular member to freely enter into the same second tubular member for diluting the hot gasses flowing inside the second tubular member.

Preferably, though not necessarily, the combustor device is furthermore characterized in that said second tubular member moreover internally accommodates a second burner adapted to mix fuel to the diluted hot gasses flowing inside the second tubular member for producing a second inflammable mixture, and furthermore at least partly delimits a second combustion chamber wherein combustion of said second inflammable mixture occurs.

Preferably according to the present invention there is also provided a gas turbine engine comprising a compressor in which compression of the outside air occurs for producing a flow of compressed air, a combustor assembly in which combustion of a mixture of fuel and compressed air arriving from said compressor occurs for producing a flow of hot gasses, and an expansion turbine in which expansion of the hot gasses arriving from combustor assembly occurs; said gas turbine engine being characterized in that said combustor assembly comprises at least one combustor device comprising a first and a second tubular members telescopically fitted in axially sliding manner to one another with the interposition of annular centering and sealing means which include at least a centering annular shoulder and a sealing ring arranged coaxial to one another; said sealing ring being axially spaced apart from said centering annular shoulder so that the axial distance between the centering annular shoulder and the sealing ring is greater than the maximum axial movement allowed between said first and said second tubular members.

Preferably, though not necessarily, the gas turbine engine is furthermore characterized in that said centering annular shoulder protrudes outwards from said first tubular member and stably slidingly abuts on a corresponding, complementary-shaped, annular mating portion of the inner surface of the second tubular member.

Preferably, though not necessarily, the gas turbine engine is furthermore characterized in that one of said first and a second tubular members is provided with an annular seat dimensioned to accommodate said sealing ring.

Preferably, though not necessarily, the gas turbine engine is furthermore characterized in that the annular seat is formed on said first tubular member axially spaced apart from said centering annular shoulder, so that the sealing ring and the centering annular shoulder stably abut against the inner surface of said second tubular member at respective annular mating portions spaced apart and separated to one another.

Preferably, though not necessarily, the gas turbine engine is furthermore characterized in that said centering annular shoulder has a polygonal profile, thus to prevent any relative axial rotation of said first and second tubular members.

Preferably, though not necessarily, the gas turbine engine is furthermore characterized in that said first tubular member delimits a first combustion chamber wherein combustion of an inflammable mixture occurs, and moreover internally accommodates a first burner adapted to mix fuel to the compressed air arriving from the compressor of the gas turbines engine for producing said inflammable mixture.

Preferably, though not necessarily, the gas turbine engine is furthermore characterized in that said second tubular member is telescopically fitted to said first tubular member for receiving the hot gasses leaving said first combustion chamber, and is provided with a series of pass-through holes and/or inwardly-protruding pipe fittings allowing a dilution gas present outside of said second tubular member to freely enter into the same second tubular member for diluting the hot gasses flowing inside the second tubular member.

Preferably, though not necessarily, the gas turbine engine is furthermore characterized in that said second tubular member moreover internally accommodates a second burner adapted to mix fuel to the diluted hot gasses flowing inside the second tubular member for producing a second inflammable mixture, and furthermore at least partly delimits a second combustion chamber wherein combustion of said second inflammable mixture occurs.

Preferably, though not necessarily, the gas turbine engine is furthermore characterized in that said combustor assembly comprises a number of said combustor devices angularly staggered around the engine shaft of the gas turbine engine.

BRIEF DESCRIPTION OF THE DRAWINGS

The present invention will now be described with reference to the accompanying drawings, which show a non-limitative embodiment thereof, in which.

DETAILED DESCRIPTION OF THE INVENTION

Figure 1:
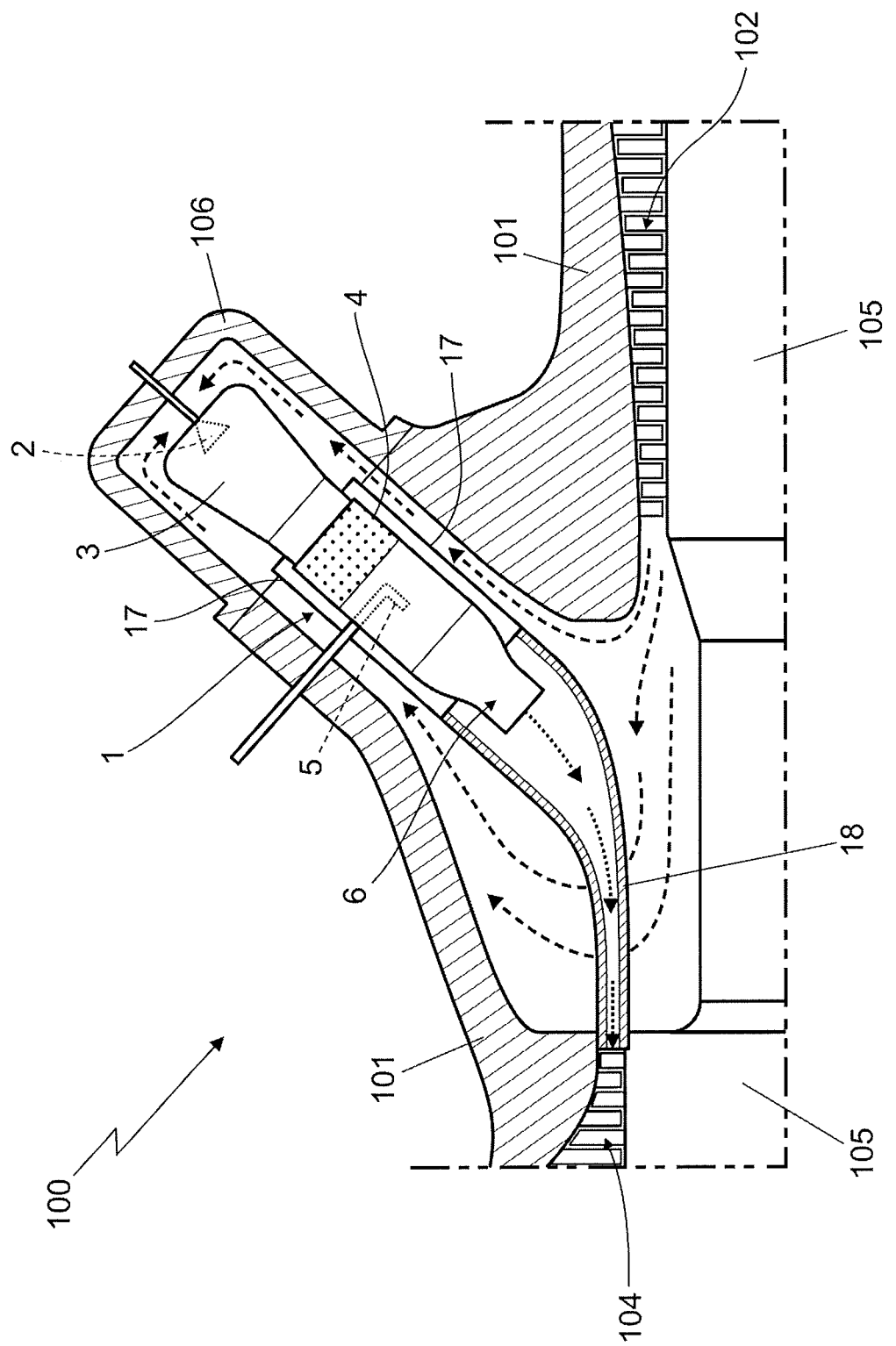
FIG. 1 is a schematic section view of part of the central section of a gas turbine engine provided with a number of combustor devices realized according to the teachings of the present invention.

With reference to FIG. 1, referral number 1 indicates as a whole a combustor device suitable to be incorporated into a gas turbine engine 100 preferably with sequential combustion which in turn is particularly adapted to drive into rotation a traditional electric generator (not shown).

More in detail, the gas turbine engine 100 preferably basically comprises a roughly-tubular, oblong outer casing 101 and, inside said outer casing 101: a preferably multi-stage, compressor 102 in which compression of the outside air occurs for producing a flow of compressed air; a combustor assembly 103 in which combustion of a mixture of the compressed air arriving from compressor 102 and fuel occurs for producing a flow of hot gasses; and a preferably multi-stage, expansion turbine 104 which is located downstream of combustor assembly 103 and in which expansion of the hot gasses arriving from of the combustor assembly 103 occurs before said hot gasses leave the gas turbine engine 100.

Combustor assembly 103, in turn, comprises at least one combustor device 1, and preferably a number of combustor devices 1 which are preferably angularly staggered around the engine shaft 105 of gas turbine engine 100, immediately downstream of compressor 102.

Overall structure of gas turbine engine 100 is widely known per se, thus no further explanations are required.

Figure 2:
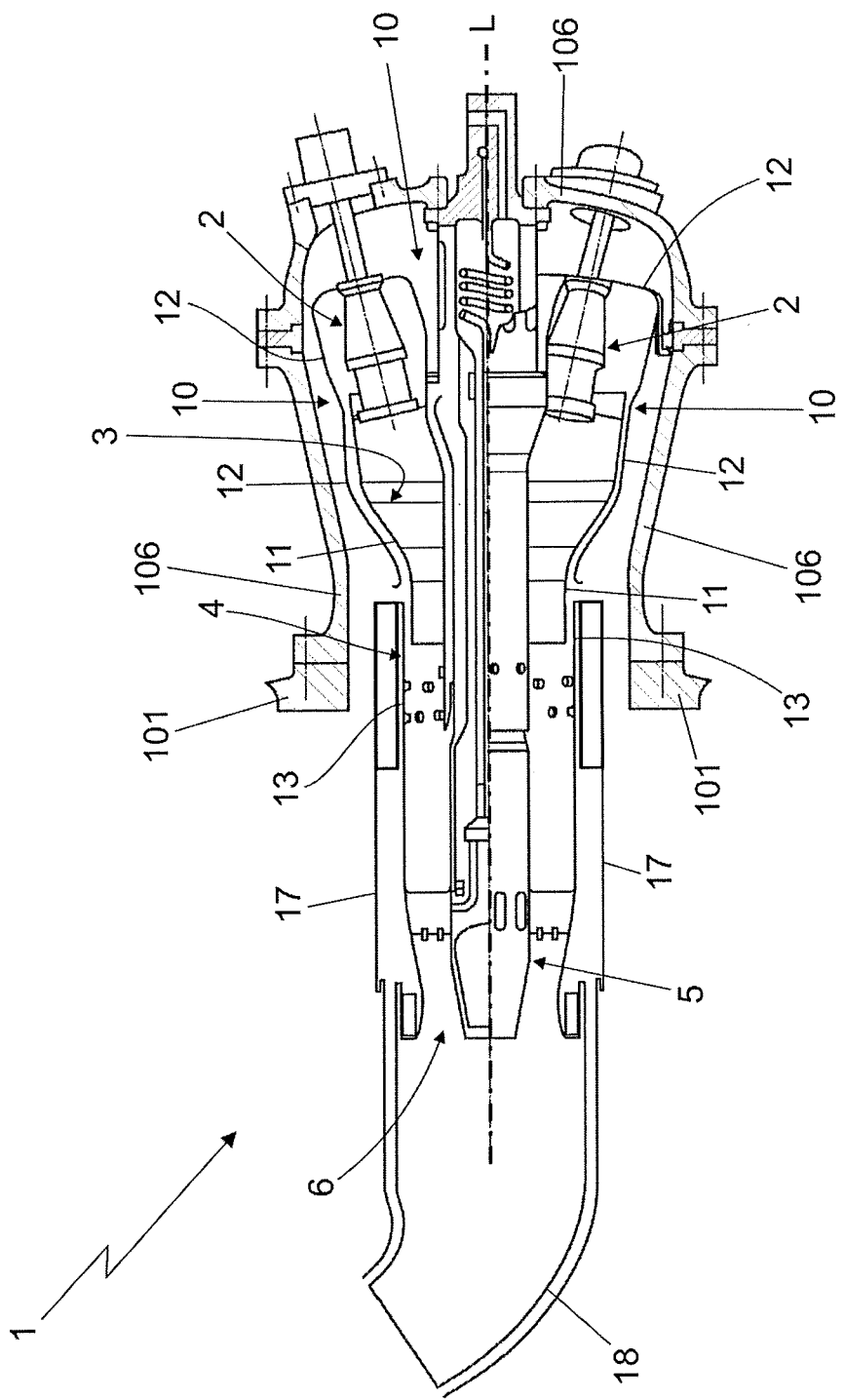
FIG. 2 is a schematic side view of the combustor device shown in FIG. 1, with parts in section and parts removed for clarity.

With reference to FIGS. 1 and 2, each combustor device 1, in turn, basically comprises: a first burner 2, a first combustion chamber 3 and a mixer 4, all substantially aligned to a main longitudinal axis L of combustor device 1 and all arranged in sequential fluid communication to one another.

In burner 2 the compressed air arriving from compressor 102 is mixed to the fuel supplied by a corresponding fuel injector connected to a first fuel supply line for producing an inflammable mixture that is combusted inside the combustion chamber 3 located immediately downstream of burner 2 for producing a flow of hot gasses. The flow of hot gasses leaving combustion chamber 3 then enters into mixer 4 wherein the hot gasses are mixed with dilution gas preferably including compressed air arriving from compressor 102.

Preferably the combustor device 1 additionally comprises: a second burner 5 and a second combustion chamber 6 arranged in sequential fluid communication to one another, downstream of mixer 4, so as to be crossed by the flow of diluted hot gasses leaving mixer 4.

In burner 5 the flow of diluted hot gasses is again mixed to the fuel arriving from a corresponding fuel injector connected to a second fuel supply line for producing a new inflammable mixture that is combusted inside the combustion chamber 6 located immediately downstream of burner 5 for producing further hot gasses. With reference to FIG. 2, in the example shown, in particular, each combustor device 1 is preferably enclosed in a preferably substantially cup-shaped, combustor housing 106 which is designed to surround the burner 2, the combustion chamber 3 and preferably also at least part of the mixer 4, and which is preferably stably coupled to a corresponding flange area of the outer casing 101 of gas turbine engine 100.

More in detail, with reference to FIG. 2 the combustor device 1 firstly comprises a main tubular casing 10 which preferably extends coaxial to the longitudinal axis L of combustor device 1, and which houses the one or more burner heads of burner 2 and furthermore delimits the combustion chamber 3 wherein combustion of the inflammable mixture occurs.

Preferably, this tubular casing 10 moreover has a twin-shell structure for being cooled by a combination of external convection and internal film convection.

In other words, the main tubular casing 10 comprises: a tubular inner member 11, commonly referred to as "inner liner", which surrounds the one or more burner heads of burner 2, delimits the combustion chamber 3 and is preferably finally provided with a plurality of effusion holes; and preferably also a tubular outer member 12 that encloses at least the proximal section of the tubular inner member 11 slightly spaced from the tubular inner member 11 so as to form an annular interspace or cavity, and is preferably provided with impingement openings to admit cooling air into the annular interspace between tubular outer member 12 and tubular inner member 11.

Preferably tubular inner member 11 and tubular outer member 12 are furthermore arranged coaxial to one another and to the longitudinal axis L of combustor device 1.

The mixer 4, in turn, preferably comprises a preferably roughly-cylindrical, tubular member 13 which preferably extends substantially coaxial to the longitudinal axis L of combustor device 1, and is telescopically fitted in axially sliding manner onto the preferably roughly-cylindrical, distal end of the tubular casing 10 for receiving the hot gasses leaving the combustion chamber 3. Preferably the tubular member 13 of mixer 4 is moreover provided with a series of pass-through holes and/or inwardly-protruding pipe fittings allowing the dilution gas present outside of tubular member 13, namely the compressed air arriving from compressor 102, to freely enter into the tubular member 13 and therein mix with the hot gasses flowing inside the tubular member 13 directed towards the second burner 5 and the second combustion chamber 6.

More in detail, the mixer 4 is preferably telescopically fitted in axially sliding and preferably also angularly rigid manner onto the preferably roughly-cylindrical, distal end of the tubular inner member 11 of tubular casing 10.

With reference to FIG. 2, preferably the distal section of tubular member 13 of mixer 4 moreover houses, downstream of the perforated proximal section of tubular member 13 provided with said pass-through holes and/or inwardly-protruding pipe fittings, the one or more burner heads of burner 5 and furthermore at least partly delimits the combustion chamber 6 wherein combustion of the second inflammable mixture occurs.

In other words, the second burner 5 is preferably located inside the tubular member 13 of mixer 4 and the second combustion chamber 6 is at least partly delimited by the distal section of said tubular member 13.

Figure 3:
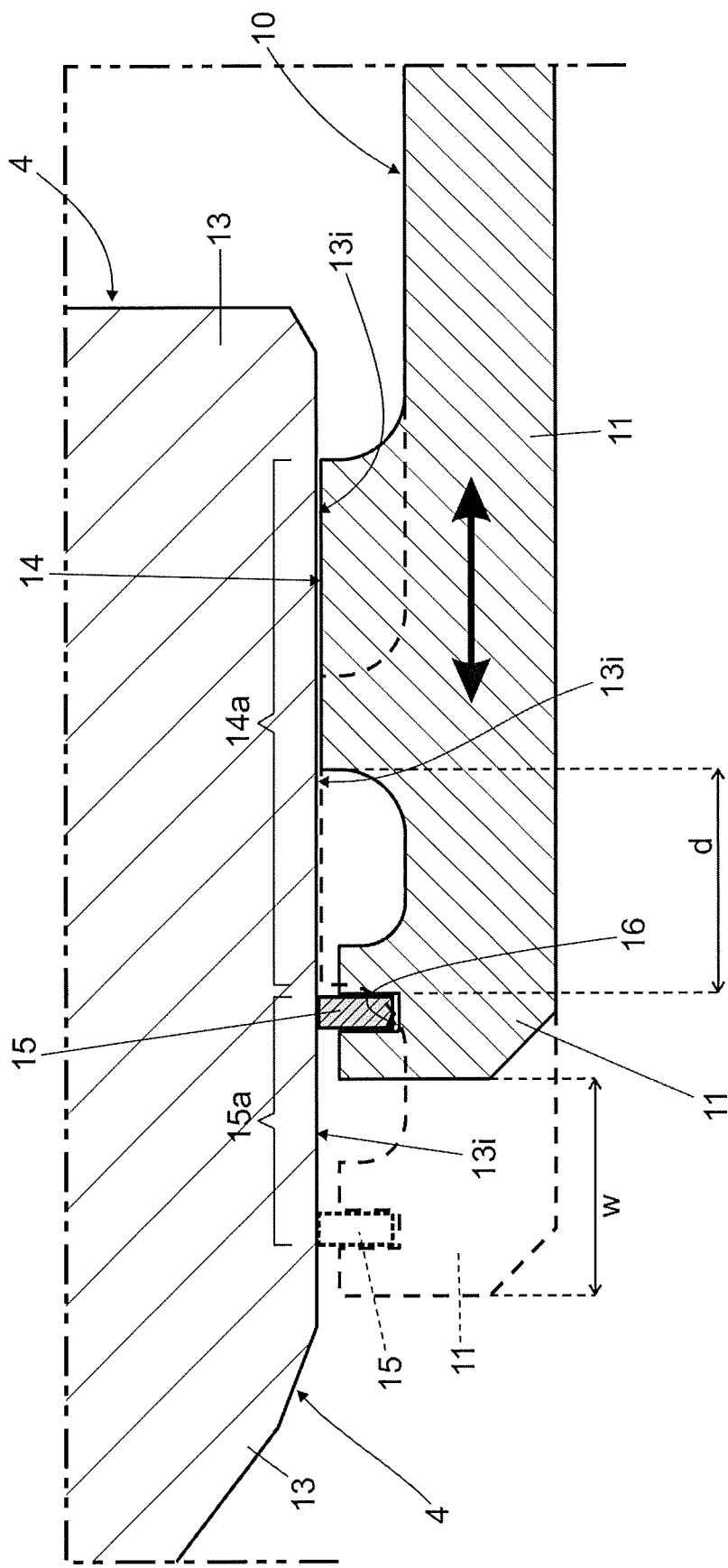
FIG. 3 is an enlarged view of the central section of the combustor device shown in FIG. 2, with parts in section and parts removed for clarity.

As regards the telescopic coupling, with particular reference to FIG. 3, the distal end of tubular casing 10, or better the distal end of tubular inner member 11, is telescopically fitted into the tubular member 13 of mixer 4 in axially sliding and preferably also angularly rigid manner with the interposition of annular centering and sealing means adapted to prevent leakages of hot gasses.

These annular centering and sealing means include at least a centering annular shoulder 14 and a sealing ring 15 or similar annular sealing member, which are arranged coaxial to one another and which are axially spaced apart to one another so that the axial distance d between the centering annular shoulder 14 and the sealing ring 15 is greater than the maximum axial movement w allowed between the tubular member 13 of mixer 4 and the tubular inner member 11 of tubular casing 10.

More in detail, the centering annular shoulder 14 preferably protrudes outwards from tubular inner member 11, at the distal end of tubular casing 10, while remaining coaxial to the longitudinal axis of tubular inner member 11, i.e. preferably coaxial to the longitudinal axis L, and stably slidingly abuts on a corresponding, complementary-shaped, annular mating portion 14a of the inner surface 13i of tubular member 13 thus to keep the tubular inner member 11 coaxial to tubular member 13.

Preferably the centering annular shoulder 14 moreover has a polygonal profile, thus to prevent any axial rotation of the tubular member 13 with respect to tubular inner member 11, about the longitudinal axis of the same tubular inner member 11.

The sealing ring 15, in turn, is fitted onto the tubular inner member 11, at the distal end of tubular casing 10, axially spaced apart from the centering annular shoulder 14 so as to stably press/abut against the inner surface 13i of tubular member 13 for preventing leakages of hot gasses.

The axial distance between the sealing ring 15 and the centering annular shoulder 14 is greater than the maximum axial movement w allowed between the tubular inner member 11 and the tubular member 13. Therefore the sealing ring 15 abuts against the inner surface 13i of tubular member 13 within a corresponding annular mating portion 15a which is spaced apart and separated from the annular mating portion 14a.

More in detail, with particular reference to FIG. 3, in the example shown the distal end of the tubular casing 10, or better the distal end of the tubular inner member 11, is preferably additionally provided with an annular seat 16 which is coaxial to the longitudinal axis of tubular inner member 11, and is directly faced to the inner surface 13i of tubular member 13. This annular seat 16 is formed on the tubular inner member 11 at a minimum axial distance d from the centering annular shoulder 14 greater that the maximum axial movement w allowed between the tubular inner member 11 and the tubular member 13, and is specifically shaped/dimensioned to stably accommodate the sealing ring 15 or similar annular sealing member.

With reference to FIGS. 1 and 2, preferably the combustor device 1 moreover comprises: a second tubular casing or jacket 17 that encloses the tubular member 13 of mixer 4 slightly spaced from the same tubular member 13, preferably so as to form an annular interspaced or cavity wherein the compressed air arriving from compressor 102 flows; and preferably also a transient duct 18 which is telescopically fitted onto the distal section of the tubular member 13 of mixer 4 and preferably also onto the distal section of tubular jacket 17, and is designed to channel the flow of hot gasses leaving the combustion chamber 7 towards the expansion turbine 104.

Preferably the tubular member 13 is furthermore telescopically fitted in axially sliding and angularly rigid manner into the second tubular casing or jacket 17.

Furthermore the second tubular casing or jacket 17 is preferably firmly coupled to a supporting member (not shown) integrally formed with the combustor housing 106 and/or with the outer casing 101 of gas turbine engine 100, and preferably directly supports the tubular member 13 of mixer 4.

General operation of combustor device 1 is similar to that of a combustor device of a traditional gas turbine engine with sequential combustion.

As regards the telescopic coupling between the distal end of tubular casing 10 and mixer 4, during transient working conditions of combustor device 1 the tubular inner member 11 of tubular casing 10 is used to move axially inside the tubular member 13 of mixer 4 due to different thermal conditions and different axial coefficients of thermal expansion.

The resulting reciprocating axial movement of the two components causes the centering annular shoulder 14 to wear the inner surface 13i of tubular member 13 at the annular mating portion 14a. The sealing ring 15, in turn, slides back and forth while resting on a different portion of the inner surface 13i of tubular member 13, i.e. the annular mating portion 15a, separated and spaced apart from the annular mating portion 14a.

Since the axial distance d between the centering annular shoulder 14 and the sealing ring 15, or better the annular seat 16 accommodating the sealing ring 15, is greater than the maximum axial movement w allowed between the tubular inner member 11 of tubular casing 10 and the tubular member 13 of mixer 4, the annular mating portion 15a never overlaps/intersects the annular mating portion 14a.

The advantages resulting from the particular telescopic coupling between the distal end of the tubular inner member 11 of tubular casing 10 and the tubular member 13 of mixer 4 are large in number.

First of all, the annular mating portion 15a of inner surface 13i of tubular member 13 now perfectly copies the profile of sealing ring 15 and not that of the centering annular shoulder 14, thus significantly increasing working life of sealing ring 15.

Furthermore the huge distance between the centering annular shoulder 14 and the spaced-apart sealing ring 15 gives to the telescopic coupling and increased stability.

Clearly, changes may be made to the combustor device 1 and to the gas turbine engine 100 without, however, departing from the scope of the present invention.

For example, a telescopic coupling using a centering annular shoulder 14 and an axially spaced-apart sealing ring 15 may be used also between the tubular member 13 of mixer 4 and second tubular casing or jacket 17, or between the distal section of tubular member 13 and the inlet of transient duct 18. Obviously the axial distance d between the centering annular shoulder 14 and the sealing ring 15 has to be greater than the allowed maximum axial movement w between the two components.

The invention claimed is:

1. A combustor device for a gas turbines engine comprising:
    a first tubular member and a second tubular member telescopically fitted in axially sliding manner to one another with interposition of annular centering and sealing means which include at least a centering annular shoulder and a sealing ring arranged coaxial to one another;
    the centering annular shoulder and an annular slot being arranged on a same end of the first tubular member, and wherein the sealing ring is arranged in the annular slot;
    the centering annular shoulder protruding radially outwards from the first tubular member and stably slidingly abuts on a corresponding, complementary-shaped, annular mating portion of a radially inner surface of the second tubular member;
    the sealing ring is axially spaced apart from the centering annular shoulder so that an axial distance between the centering annular shoulder and the sealing ring is greater than a maximum axial movement allowed between the first tubular member and the second tubular member; and
    wherein the centering annular shoulder has a polygonal profile to prevent any relative axial rotation of the first tubular member and the second tubular member.

2. The combustor device according to claim 1, wherein the annular slot is formed on the first tubular member axially spaced apart from the centering annular shoulder, so that the sealing ring and the centering annular shoulder stably abut against the radially inner surface of the second tubular member at respective annular mating portions spaced apart and separated relative to one another.

3. The combustor device according to claim 1, comprising:
    a first combustion chamber, wherein the first tubular member delimits the first combustion chamber which is configured for combustion of an inflammable mixture, and which is configured to internally accommodate a first burner adapted to mix fuel with compressed air for producing the inflammable mixture.

4. The combustor device according to claim 3, wherein the second tubular member is telescopically fitted to the first tubular member for receiving hot gasses leaving the first combustion chamber, and comprising:
- a series of pass-through holes and/or inwardly-protruding pipe fittings for allowing a dilution gas present outside, of the second tubular member to freely enter into the second tubular member for producing diluted hot gasses flowing inside the second tubular member.

5. The combustor device according to claim 4, comprising:
- a second combustion chamber, wherein the second tubular member is configured to internally accommodate a second burner adapted to mix the fuel to the diluted hot gasses flowing inside the second tubular member for producing a second inflammable mixture, and where the second tubular member at least partly delimits the second combustion chamber for combustion of the second inflammable mixture.

6. A gas turbine engine comprising:
- a compressor for compression of air for producing a flow of compressed air;
- a combustor assembly for combustion of a mixture of fuel and the compressed aft from the compressor for producing a flow of hot gasses;
- an expansion turbine for expansion of the hot gasses from the combustor assembly; and
- at least one of the combustor device according to claim 1.

7. The gas turbine engine according to claim 6, wherein the combustor assembly comprises:
- a number of combustor devices of the at least one of the combustor device angularly staggered around an engine shaft of the gas turbine engine.

* * * * *